Patented Aug. 22, 1933

1,923,944

UNITED STATES PATENT OFFICE

1,923,944

AZO DYESTUFFS FOR LEATHER

Mordecai Mendoza, West Didsbury, and John Hannon, Gorton, England, assignors to Imperial Chemical Industries Limited, a Corporation of Great Britain No Drawing. Application December 24, 1931, Serial No. 583,140, and in Great Britain January 28, 1931

6 Claims. (Cl. 260—72)

This invention relates to new chemical compounds, more particularly dyes and processes for their manufacture.

It is well known that certain shades of brown are difficult to obtain on leather except by use of mixtures of known dyes and that the use of mixtures is always objectionable because the ingredients of the mixture tend to differ in affinity and penetrating power.

It is an object of the present invention to produce new chemical compounds especially valuable for dyeing leather directly in brown shades. Further objects are the production of dyes which level well, possess good penetrating power and affinity for leather, and in general to advance the art. Other objects will appear hereinafter.

These objects are accomplished according to the present invention whereby we obtain azo dyes capable of giving very deep brown shades by coupling a diazotized amino-azo compound for convenience called A and a diazotized amino compound for convenience called B in that or the reverse order with m-phenylene diamine or a 4-substituted homologue or alkoxy- or halogeno-derivative thereof, the amino-azo compound A being obtained by coupling diazotized aniline, a homologue or a chloro-nitro- or sulpho- derivative thereof with a naphthylamine or amino-naphthol or a sulphonic acid thereof (all capable of further diazotization), and the amino compound B being aniline or a homologue or a chloro-, nitro- or sulpho-derivative thereof.

While the invention is susceptible of considerable variation and modification in the manner of its practical application, the following examples will illustrate some of the products falling within the invention and how they may be prepared. The proportions are given in parts by weight.

*Example 1.*—Nine and three-tenth parts of aniline are diazotized in the customary manner and the resulting diazo solution is added with stirring below 10° C. to a solution of 22.3 parts of the technical mixture of Cleves 1:6- and 1:7 acids in 300 parts of water and 5.3 parts of calcined sodium carbonate containing 21 parts of sodium acetate crystals. Coupling proceeds with the formation of a dark brown compound and is complete in about one hour. Sufficient caustic soda lye (33%) is then added to make the coupling mixture faintly alkaline to litmus, a bright yellowish orange suspension being obtained. One hundred parts of salt are then stirred in and 35 parts of oil of vitriol diluted with an equal amount of ice are added quickly followed by 9.7 parts of sodium nitrite in 10% solution. Rediazotization is effected by stirring the mixture for one hour at 10° C. and then allowing it to stand for a further 12 hours at this temperature. The light reddish brown diazo compound is filtered off and pressed and is then stirred with 200 parts of water and ice (in about equal parts). The suspension is then mixed with 10.8 parts of m-phenylene-diamine, dissolved in 200 parts of water. On completion of the second coupling (about 12 hours) the diazo suspension obtained in the usual manner from 21.8 parts of p-nitraniline-o-sulphonic acid by means of 35 parts of 26% hydrochloric acid, 250 parts of water and 69 parts of a 10% aqueous solution of sodium nitrite is added. Into the mixture sufficient caustic soda lye (33%) is run so that the reaction is definitely alkaline to litmus and when the final coupling is completed (about one hour) the dye is isolated from its dark brown solution by warming to 50° C. and salting out.

When dry it is a very dark brown powder. On chrome tanned calf level reddish nigger shades are obtained with good penetration. Medium maroon shades of similar good levelling are obtained on vegetable tanned skiver.

*Example 2.*—If in Example 1 the technical mixture of Cleves acids is replaced by the 1:7 isomer and the p-nitraniline-o-sulphonic acid by the equivalent amount of sulphanilic acid (17.3 parts) the dye obtained dyes vegetable and chrome tanned leather in full red brown shades which are level and of good penetration.

*Example 3.*—If in Example 1 above the equivalent amount of metanilic acid is used in place of aniline, a-naphthylamine is substituted for the Cleves acid mixture and the p-nitraniline-o-sulphonic acid is replaced by the corresponding amount of aniline 2:5-disulphonic acid there is obtained a dye which yields level deep maroon shades on vegetable tanned skiver, and deep brown maroon shades on chrome tanned calf.

*Example 4.*—Nine and three-tenth parts of aniline are diazotized in the customary manner and coupled in alkaline solution with 23.9 parts of 2:5-amino-naphthol-7-sulphonic acid. The resulting amine compound is rediazotized and coupled with m-phenylenediamine in the manner described in Example 1. To the resulting disazo combination a diazo suspension obtained from 17.3 parts of sulphanilic acid in the usual manner is added followed by sufficient 33% caustic soda lye to give a definitely alkaline reaction. The trisazo dye is isolated in the usual way. It yields level deep brown maroon shades of good penetrability on vegetable tanned skiver and chrome tanned calf.

It will be understood that the invention is not limited to the particular examples set forth above either as to the specific combination described, the proportions of materials, temperatures, etc., or the exact manner of procedure. For instance, the aniline or aniline sulphonic acids employed in producing the amino-azo compound heretofore referred to as A may be replaced by a homologue of aniline or the aniline sulphonic acids such as, for example, a toluidine or xylidine or other primary aromatic amine of the benzene series or sulphonic acid derivative thereof. Good results are also obtained when halogen or $-NO_2$ radicals are substituted in the aniline or its homologue or sulpho- derivatives of these compounds. Likewise, any other naphthylamine or amino-naphthol or sulphonic acid derivative thereof (all capable of further diazotization) may be employed as a coupling component in the formation of the so-called compound A. In a like manner, the amino compound previously referred to as B may correspond to other combinations of aniline or homologue thereof with halogen, $-NO_2$, and $-SO_3H$ groups.

The meta-phenylenediamine may be replaced by derivatives thereof such as, for example, a 4-substituted homologue. Desirable results are obtained when the diamine or homologue thereof contains as a substituent an alkoxy or halogen group such as $-OCH_3$ or $-Cl$.

As previously indicated, the exact method of procedure involved in producing the compounds obtainable in accordance with the present invention may vary somewhat. Thus, instead of first coupling the diazotized amino-azo compound A with the diamine, and then coupling the product with the diazotized amino compound B, the order of coupling may be reversed. That is to say, the diazotized amino compound B may be coupled with the diamine initially and thereafter the resultant product coupled with the diazotized amino-azo compound represented by A.

The new dyes herein described have extremely good affinity for both vegetable tanned skiver and chrome tanned calf. Their penetrating power is good and they level well. Furthermore, shades produced by these dyes, e. g., the shades known as "chocolate" and "nigger", are obtained by direct application of the dye to the material to be colored. These shades as is well known have been difficult to obtain hitherto except by use of a mixture of dyes.

As many apparent and widely different embodiments of this invention may be made without departing from the spirit and scope thereof, it is to be understood that we do not limit ourselves to the embodiment thereof except as defined in the appended claims.

We claim:

1. The dye which is substantially identical with the product obtainable by coupling diazotized aniline with a mixture of 1: 6 and 1: 7 naphthylamine sulphonic acids, diazotizing the resultant amino-azo compound, coupling the product obtained with m-phenylenediamine, and coupling the resultant product with diazotized p-nitraniline-o-sulphonic acid.

2. The dye which is substantially identical with the product obtainable by coupling diazotized aniline with a naphthylamine sulphonic acid capable of being diazotized, diazotizing the resultant amino-azo compound, coupling the product obtained with m-phenylenediamine, and coupling the resultant product with a diazotized aniline sulphonic acid.

3. A process for producing azo dyes which comprises coupling meta-phenylene-diamine, which may have substituted thereon a member selected from the group consisting of alkoxy and halogen, with two equivalents of dissimilar diazo salts, one of which equivalents is a diazotized amino-azo compound, obtained by coupling diazotized aniline which may have substituted thereon members selected from the group consisting of sulfonic acid, halogen and nitro, with a naphthylamine which may have substituted thereon members selected from the group consisting of hydroxy and sulfonic acid, and the other of which equivalents is a diazotized aniline which may have substituted thereon members selected from the group consisting of sulfonic acid, halogen and nitro.

4. A process for producing azo dyes which comprises coupling meta-phenylene-diamine with two equivalents of dissimilar diazo salts, one of which equivalents is a diazotized amino-azo compound, obtained by coupling diazotized aniline which may have substituted thereon a sulfonic acid group with a naphthylamine which may have substituted thereon a member selected from the group consisting of hydroxy and sulfonic acid, and the other of which equivalents is a diazotized aniline which may have substituted thereon members selected from the group consisting of sulfonic acid and nitro.

5. An azo dye having the following general formula:

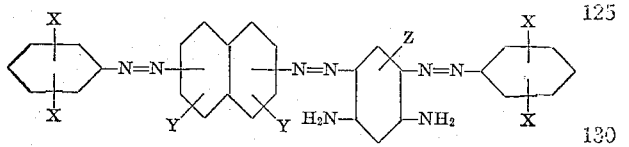

wherein X represents hydrogen, sulfonic acid, halogen and nitro, Y represents hydrogen, hydroxy and sulfonic acid, and Z represents hydrogen, alkoxy and halogen.

6. An azo dye having the following general formula:

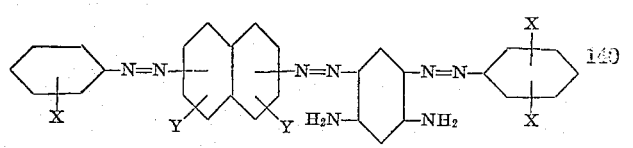

wherein X represents hydrogen, sulfonic acid and nitro, and Y represents hydrogen, hydroxy and sulfonic acid.

MORDECAI MENDOZA.
JOHN HANNON.